No. 714,063. Patented Nov. 18, 1902.
S. B. TILY & J. G. & M. O. REHFUSS.
CUTTING AND FEEDING MECHANISM FOR LABEL MAKING MACHINES.
(Application filed June 4, 1901.)
(No Model.) 5 Sheets—Sheet 1.

No. 714,063. Patented Nov. 18, 1902.
S. B. TILY & J. G. & M. O. REHFUSS.
CUTTING AND FEEDING MECHANISM FOR LABEL MAKING MACHINES.
(Application filed June 4, 1901.)
(No Model.) 5 Sheets—Sheet 2.

Witnesses:-

Inventor:-
Stephen B. Tily
John G. Rehfuss &
Martin O. Rehfuss
by their Attorneys:-

No. 714,063. Patented Nov. 18, 1902.
S. B. TILY & J. G. & M. O. REHFUSS.
CUTTING AND FEEDING MECHANISM FOR LABEL MAKING MACHINES.
(Application filed June 4, 1901.)
(No Model.) 5 Sheets—Sheet 3.

Witnesses:—
Frank P. A. Graham
Louis M. F. Whitehead

Inventors:—
Stephen B. Tily
John G. Rehfuss &
Martin O. Rehfuss
by their Attorneys:—
Howson & Howson No. 714,063. Patented Nov. 18, 1902.
S. B. TILY & J. G. & M. O. REHFUSS.
CUTTING AND FEEDING MECHANISM FOR LABEL-MAKING MACHINES.
(Application filed June 4, 1901.)
(No Model.) 5 Sheets—Sheet 4.

Witnesses:—

Inventors:—
Stephen B. Tily
John G. Rehfuss &
Martin O. Rehfuss
by their Attorneys:—

No. 714,063. Patented Nov. 18, 1902.
S. B. TILY & J. G. & M. O. REHFUSS.
CUTTING AND FEEDING MECHANISM FOR LABEL MAKING MACHINES.
(Application filed June 4, 1901.)
(No Model.) 5 Sheets—Sheet 5.

Witnesses:—
Hamilton T. Turner
Herman C. Metius.

Inventors:—
Stephen B. Tily,
John G. Rehfuss,
Martin O. Rehfuss;
by his Attorneys,
Howson & Howson

UNITED STATES PATENT OFFICE.

STEPHEN B. TILY, JOHN G. REHFUSS, AND MARTIN O. REHFUSS, OF PHILADELPHIA, PENNSYLVANIA, ASSIGNORS TO JOHN WANAMAKER, OF PHILADELPHIA, PENNSYLVANIA.

CUTTING AND FEEDING MECHANISM FOR LABEL-MAKING MACHINES.

SPECIFICATION forming part of Letters Patent No. 714,063, dated November 18, 1902.

Application filed June 4, 1901. Serial No. 63,118. (No model.)

*To all whom it may concern:*

Be it known that we, STEPHEN B. TILY, JOHN G. REHFUSS, and MARTIN O. REHFUSS, citizens of the United States, and residents of Philadelphia, Pennsylvania, have invented certain Improvements in Cutting and Feeding Mechanism for Label-Making Machines, of which the following is a specification.

Our invention relates to certain improvements in machines for making labels, having for its object the provision of improved detail mechanism for cutting and feeding labels in a machine designed to automatically make labels from a ribbon of suitable material supplied from a reel. This object we attain as hereinafter set forth, reference being had to the accompanying drawings, in which—

Figure 1:
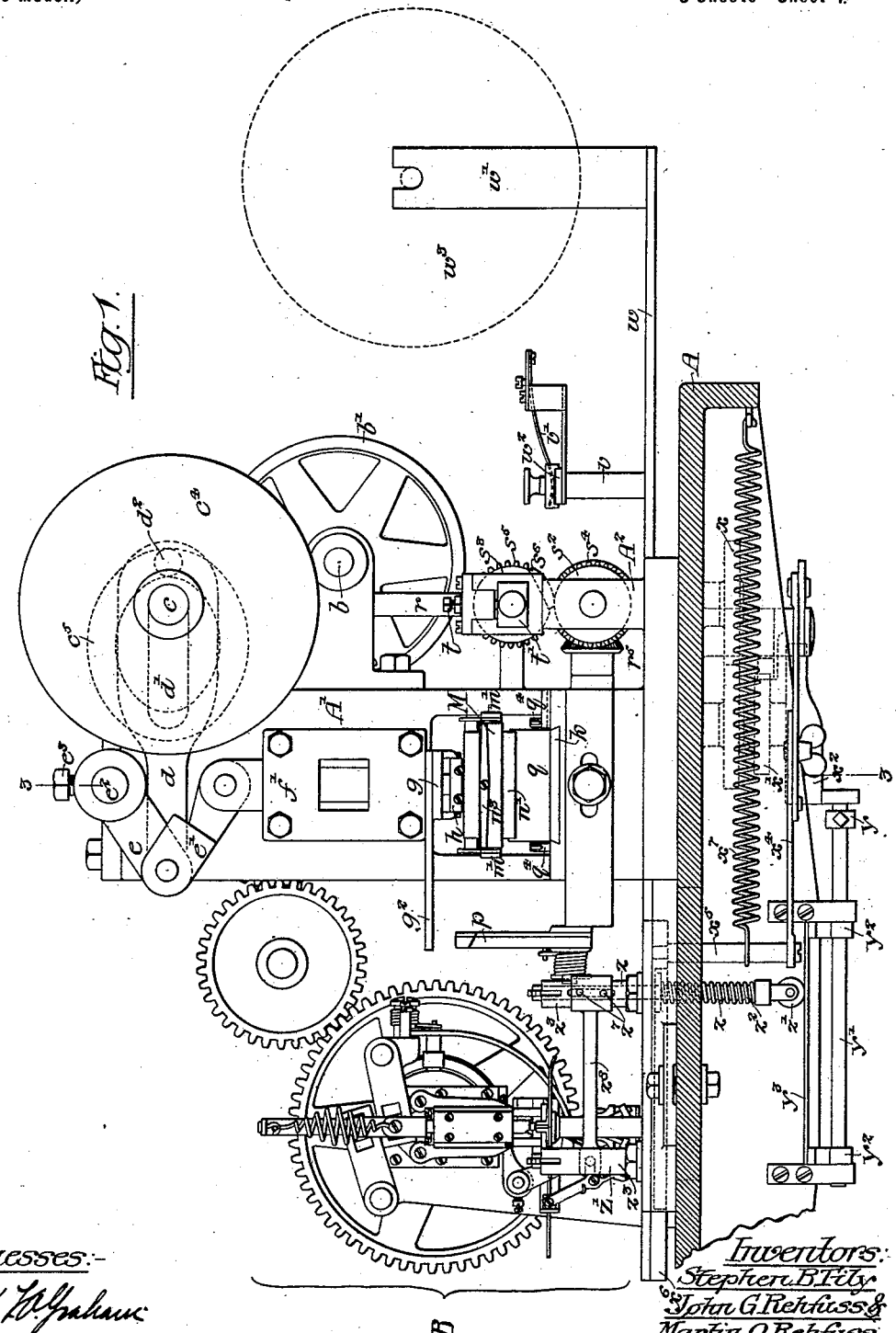
Figure 2:
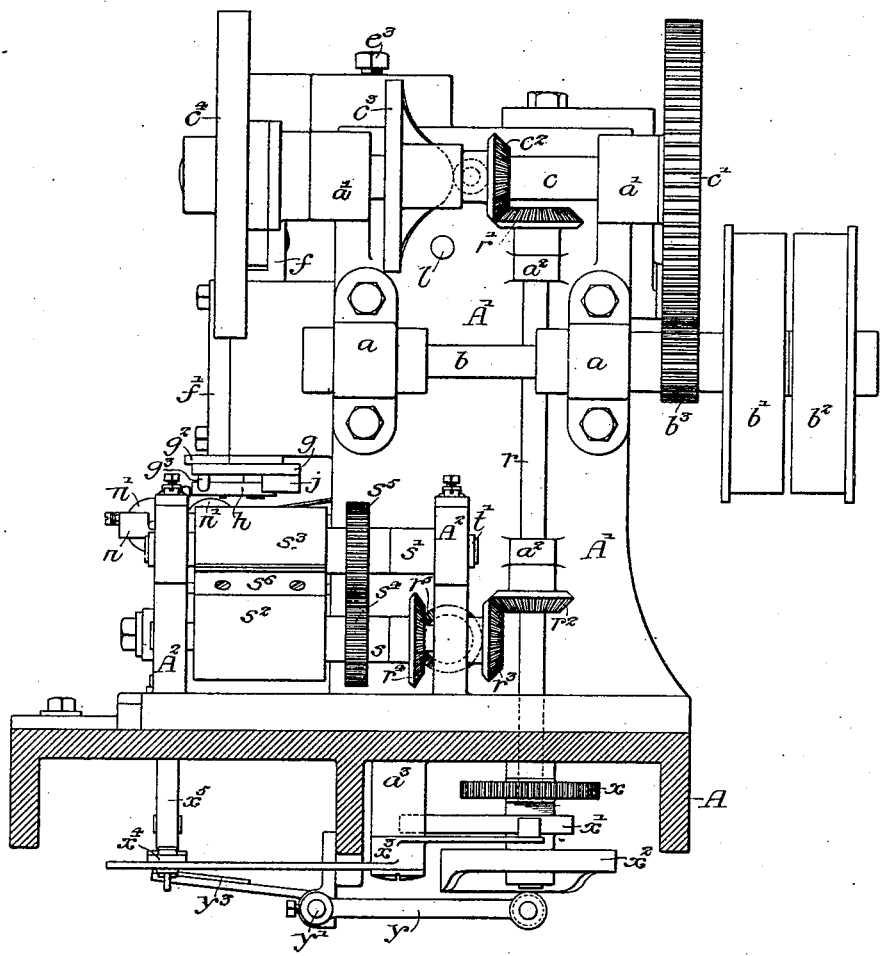
Figure 3:
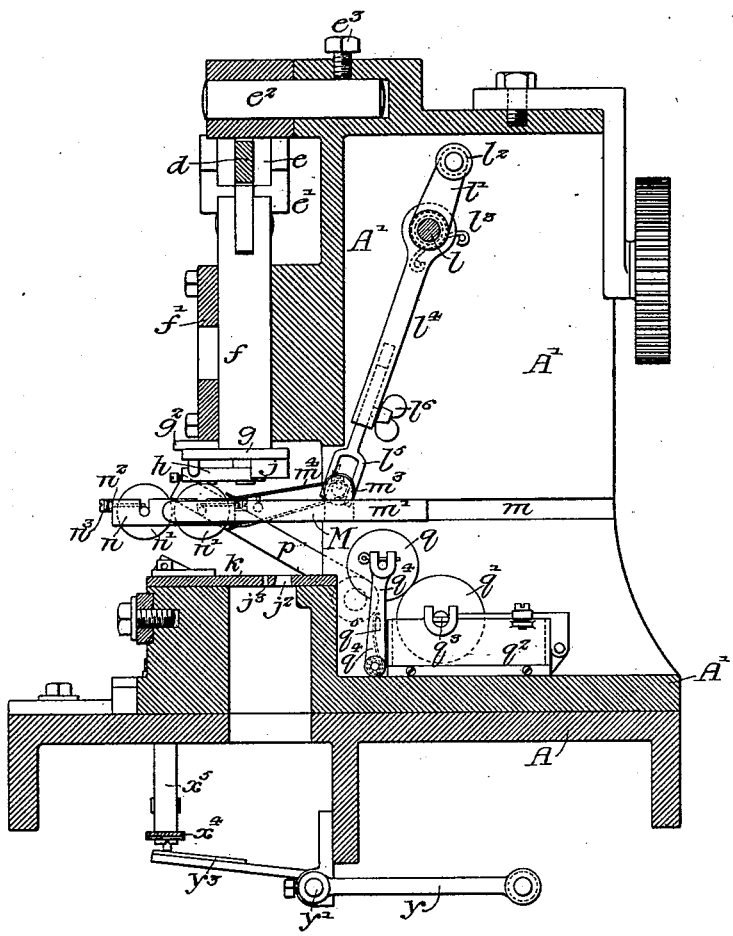
Figure 4:
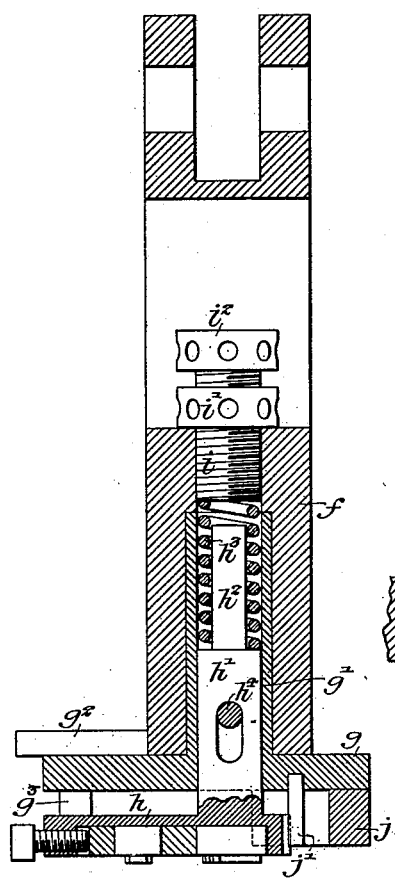
Figure 6:
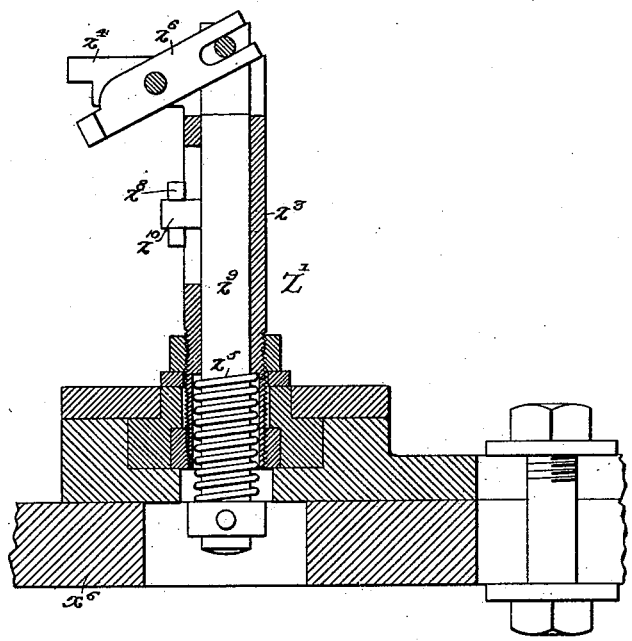
Figure 5:
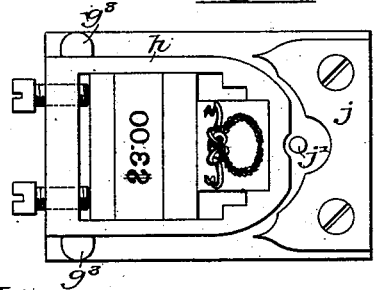
Figure 7:
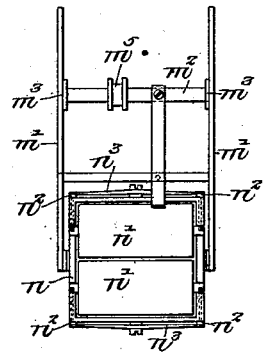
Figure 8:
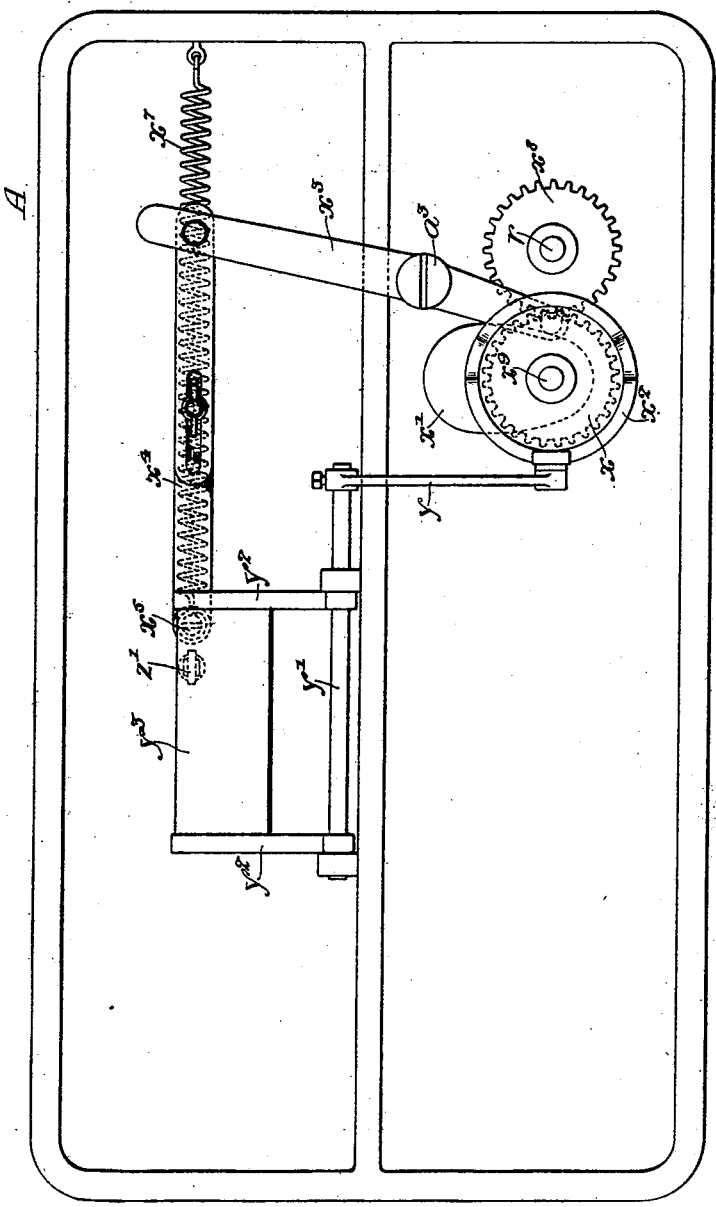

Figure 1 is a front view of our improved machine. Fig. 2 is a side view of the same. Fig. 3 is a vertical sectional view on the line 3 3, Fig. 1. Fig. 4 is a vertical sectional view of the plunger. Fig. 5 is an inverted plan of the same. Fig. 6 is a vertical sectional view of one of the carriers for taking the labels from the machine. Fig. 7 is a plan view of the inking-rollers and their carrier-frame, and Fig. 8 is an inverted plan view of the gripper actuating and carrying mechanism.

It will be understood that while the apparatus hereinafter described is preferably used in connection with a machine for placing loops of string in holes in the labels and for which application for Letters Patent has been made, dated May 31, 1901, Serial No. 62,577, it may, if desired, be operated independently, the necessary string being afterward inserted by hand or by any other means.

In the above-mentioned drawings, A is a table, having mounted upon it a casting or frame A'. Journals $a$ $a$, attached to this frame, support a shaft $b$, on which are fast and loose pulleys $b'$ $b^2$ and a pinion $b^3$. This latter meshes with a gear-wheel $c'$ on a shaft $c$, Fig. 2, operating in bearings $a'$ $a'$, also on the frame A', the shaft having on it, besides the said gear-wheel $c'$, a bevel-gear $c^2$, a cam $c^3$, and an internally-grooved cam $c^4$, the said shaft also passing through a slot $d'$ in a piece $d$, as shown in dotted lines in Fig. 1.

The cam $c^4$ has an eccentric groove $c^5$ in its inner face, and the piece $d$ has a pin $d^2$, which is constructed to enter said groove, the said piece $d$ being thereby reciprocated when the cam $c^4$ is revolved. This piece $d$ has an extended portion, which is connected to a toggle connection formed by two arms $e$ and $e'$, the arm $e$ being movably supported on a short shaft or stud $e^2$, held stationary in a recess in the frame by a set-screw $c^3$. The arm $e'$ is pinned to the upper end of a plunger $f$, which is shown in detail in Fig. 4. From an inspection of this figure it will be seen that the plunger is constructed to be reciprocated in a recess in the frame A', being retained in said recess by a plate $f'$.

A die-plate $g$ has a tubular extension $g'$, which fits a corresponding recess in the plunger, and this plate in turn is constructed to receive a type-holding frame $h$, the latter having a plunger-like part $h'$. This enters the tubular extension $g'$ and has a spring $h^3$, surrounding a section $h^2$, less in diameter than the part $h'$, the spring abutting against an adjusting-screw $i$, which is provided with jam-nut $i'$ and a head $i^2$, constructed to be turned by a suitable wrench. The type-frame $h$ is retained in position in the plunger $f$ by a pin $h^4$, passing through the part $h'$, this latter being slotted, as shown in Fig. 4, to allow of a limited vertical movement of said type-frame.

Guides $g^3$ $g^3$ project from the bottom face of the die-plate $g'$, extending along the sides of the type-frame $h$ and serving, with its plunger-like extension $h'$, to maintain it constantly in the same relative position.

A shearing-piece $j$ is secured to the face of the die-plate $g$ by screws, and there is a punch $j'$ also held in the plate, there being correspondingly-shaped recesses $j^2$ and $j^3$ in a stationary die-plate $k$, mounted on a table-like part of the frame A' and fitting into a dovetail groove.

A bar $g^2$ is rigidly secured to the upper surface of the die-plate, and it extends over one side of the stationary plate $k$, being placed to engage a knife $p$, pivoted to the side of the frame in the line in which the labels pass during the process of their manufacture. On the pivot which supports this knife is a spring suitably attached thereto and always tending to maintain said knife in and to return it to the raised position shown in the drawings.

On a shaft $l$, supported in bearings in the frame A', is fixed an arm $l'$, which carries a roller $l^2$, constructed to be engaged by the irregular periphery of the cam $c^3$, being held in contact with the same by a spring $l^3$. This spring is wound on the shaft $l$, having one end fixed to the frame and the other end made fast to a second arm $l^4$, also keyed on the said shaft. The arm has a recess, into which fits a forked extension $l^5$, constructed to be moved in or out of the same and to thereby vary the total length of the arm, the said extension being retained in position by a winged set-screw $l^6$.

Guides or grooves $m$ are formed in the sides of the frame, and in these operates a frame M, consisting of two side members $m'\,m'$, held together by a cross-piece $m^2$, which is supported on upright projections $m^3$, the forked end $l^5$ of the arm $l^4$ engaging said cross-piece at $m^5$. Pivotally supported at one end of the frame is a roller-frame $n$, in which are journaled two inking-rollers $n'\,n'$, the shafts of the same being retained in their bearings by removable pins $n^2\,n^2$. These are kept in position by springs $n^3\,n^3$, supported as shown in Fig. 7.

A spring $m^4$, held to the cross-piece $m^2$ by a screw, (shown in dotted lines in Fig. 3,) is placed to bear upon the top and bottom of one end of the roller-frame $n$, and thereby keeps it in an approximately horizontal plane, while allowing it freedom to adjust itself to the type in the frame $h$ and to an ink-distributing roller $q$.

An ink-reservoir $q^2$ is placed on the frame A' and has in it a collecting-roller $q'$, turning in suitable bearings, the shaft of said roller projecting beyond the bearing on one side and having a projection $q^3$ on its end. The distributing-roller $q$, above referred to, is supported in bearings on a V-shaped frame $q^4$, on which there is a spring $q^5$, (shown in dotted lines in Fig. 3,) tending to press said roller against the collecting-roller $q'$.

Meshing with the bevel-gear $c^2$ is a similar gear $r'$, fixed on the end of a vertical shaft $r$, supported in bearings $a^2\,a^2$ on the frame A' and having on it a second bevel-gear $r^2$.

There are two vertical projections $A^2$ on the frame A', in which are journaled two shafts $s\,s'$, carrying feeding-rollers $s^2\,s^3$, respectively. A bevel gear-wheel $s$ transmits motion thereto from the vertical shaft $r$, there being also a second bevel-gear $r^4$ on said shaft $s$. This latter gear meshes with a similar gear $r^5$, keyed to a shaft constructed to turn in a bearing in the frame A', the said shaft having a recess in its inner end corresponding in shape and position to the projection $q^3$ on the shaft of the collecting-roller $q'$, and as it normally engages said projection serves to transmit motion to said roller.

The shafts $s$ and $s'$ are operatively connected by suitable gear-wheels $s^4$ and $s^5$, and while one of the feeding-rollers—viz., $s^2$—is of the ordinary cylindrical form the other, $s^3$, is made with a portion of its surface flat. To this is attached by screws a cylindrical segment $s^6$, the surface of which normally comes in contact with the roller $s^2$ as the two rollers are turned. The bearing-caps at the top of the parts $A^2$ are provided with adjustable screws $t$, constructed to bear upon and regulate the position of the boxes $t'\,t'$, in which runs the shaft $s'$, thereby allowing a certain amount of vertical play of the said shaft.

A piece $w$, supported from the frame A', has uprights $w'$, at the top of which are bearings holding a shaft carrying a reel of material to be made into labels. A guide $w^2$, also on the piece $w$, is of any desired construction, consisting in the present instance of an upright $v$, having guiding-jaws and a tension-spring $v'$.

The vertical shaft $r$ passes through the frame A' of the machine and has fixed to its lower end a gear-wheel $x^8$, which meshes with a similar gear $x$ on a shaft also supported on the frame, which carries two cams $x'$ and $x^2$, as illustrated in Fig. 8.

An arm of a lever $x^3$ is provided with a roller and placed so that it may engage with the cam $x'$, the said lever being pivoted on a projection $a^3$ from the under side of the frame A' and having its other arm attached to one end of a connecting-arm $x^4$. This is made in two parts adjustably connected together, as shown, its other end being connected to a post or pin $x^5$, extending through an elongated slot in the frame A' and rigidly attached to a slide $x^6$, there being a spring $x^7$ extending between the frame A' and the said post $x^5$, which tends to keep the slide in its retracted position and to maintain the roller of the lever $x^3$ in contact with its cam. A lever-arm $y$, pivoted in suitable bearings, is made to engage the second cam $x^2$, the shaft $y'$, to which said arm is pivoted, extending laterally and having arms $y^2$ fixed to it, which carry a plate $y^3$.

Projecting through the slot in which the post $x^5$ operates is a rod or spindle $z$, having on its lower end a roller $z'$, constructed to move over the plate $y^3$, and with a spring $z^2$, confined between said roller and the under side of the slide $x^6$, to which it is secured.

The above rod forms part of one of two carriers Z Z' for removing finished labels from the machine, the carrier Z' being shown in detail in Fig. 6. The carriers are preferably duplicates of one another and consist, essentially, of a tubular standard $z^3$, held to the slide $x^4$ in any desired manner and provided with a fixed jaw $z^4$ at its upper end. Within the standard is the rod $z$, and there is a spring $z^5$ surrounding the corresponding rod $z^9$ and tending to keep it in its lowest position. A pin at the top of the rod $z$ engages the end of a jaw $z^6$, which is pivoted, as shown, to the stationary jaw $z^4$. Pins $z^7$, passing through the rod, project through slots in the standard $z^3$ and operatively connect said rod to the box-like end of an arm $z^8$, which is constructed to transmit motion from the rod $z$ to the rod $z^9$ in the carrier $Z'$, the said arm having a forked end and engaging a pin $z^{10}$, connected to the rod $z^9$, as shown.

At B is shown mechanism for inserting and fastening strings in the labels cut out and printed by the invention herein shown. This machine B while firmly holding a label is constructed to pass a string through the string-hole thereof and after cutting off a length of said string from its source of supply fasten its ends together, so as to form two loops, in one of which the label is strung. The carriers $Z\ Z'$, above described, serve to deliver the labels to and take them away from the machine B. This mechanism is not described herein, as it is fully covered in the application filed May 31, 1901, Serial No. 62,577.

The operation of our label cutting and printing machine is as follows: The paper or pasteboard strip from which labels are to be made is taken from the reel (shown in dotted lines at $w^3$) and after passing through the guide $w^2$ passes between the rollers $s^2$ and $s^3$, being, however, only fed forward when it comes in contact with the segment $s^6$ on the roller $s^3$. The strip thus intermittently fed forward passes to the stationary die-plate $k$ and so under the plunger $f$, which during the time that the said strip is not being moved is forced down by the action of the toggle-arms $e$ and $e'$. Power for this action is transmitted from the pulley $b'$ through the gear-wheels $b^3$ and $c'$, the cam $c^4$, and the piece $d$. As the plunger descends the type in the type-frame $b$ comes into contact with the strip of pasteboard, printing on it any desired characters or symbols. As shown in Figs. 1 and 3, this type has previous to the descent of the plunger been inked by the rollers $n'\ n'$, the retaining-frame $n$ of which, with the frame $m'$, has been moved forward by the action of the cam $c^3$ upon the arms $l'$ and $l^5$. When the rollers $n'\ n'$ are moved back out of the path of the descending plunger, they are passed over the distributing-roller, receiving the ink therefrom which it has collected by the revolution of the roller $q'$ in the reservoir. The plunger and the toggle-arms are so proportioned that after the type in the frame $h$ has come into contact with the paper strip it still continues to descend, and the spring $h^3$ being compressed the frame $h$ is forced upwardly, the cutter $j$ and the punch $j'$ then coming against said strip and cutting out the curved portion of the label, besides punching a hole for the insertion of a string, the pieces cut out of the strip passing through the openings $j^2\ j^3$ in the plate $k$. The plunger is then raised and the cylindrical segment $s^6$, which is of a width exactly equal to the width of a label, acts to feed the strip forward again. In the present machine after the strip has been fed forward three times from the plunger it will project over the edge of the table formed by the frame $A'$ of the machine to an extent equal to the width of one label, and on the next downward stroke of the plunger its projecting bar $g^2$ will force the knife $p$ against the said table edge and cut off the label. However, just before the label is cut off from its strip the movable jaw $z^2$ of the carrier $Z$, which is so adjusted as to be in line with and at one side of the strip, closes and grasps the label to be cut off, being actuated by the action of the cam $x^2$ transmitted through the arm $y$, the shaft $y'$, the plate $y^3$, and the rod $z$. As soon, therefore, as the label is cut off the carrier-slide $x^6$ is moved away from the knife by the action of the cam $x'$ upon the lever $x^3$ transmitted through the bar $x^4$ and the post $x^5$. The carrier $Z$ then delivers the label to the machine B at the left of Fig. 1, which inserts, cuts off, and fastens a string in the hole made by the punch $j'$, after which it is grasped by the second carrier $Z'$, operated from the carrier $Z$, as shown, and deposited in a suitable receptacle. After delivering a label to the stringing-machine B the carriers $Z$ and $Z'$ are moved toward the printing and cutting machine by the action of the spring $x^7$.

We claim as our invention—

1. The combination of a frame, a plunger, means for reciprocating the same, means for intermittently feeding a strip of material to the plunger, means on the plunger for partially cutting out labels from said strip, a knife movably carried by the frame adjacent to the plunger, a bar connected to the plunger extending over the knife and placed to engage the same when the plunger is reciprocated, the said knife being constructed to sever partially-formed labels from the strip, substantially as described.

2. The combination of a frame, a driving-shaft, a reciprocating plunger operated thereby and provided with means for partially cutting out a label, means for feeding a strip of raw material to the plunger, means for cutting the finished labels from the strip, a horizontally-reciprocable slide, a standard thereon having jaws constructed to hold and to remove a label after it has been cut off, with means for reciprocating the slide and other means for operating the jaws respectively, substantially as described.

3. The combination of a frame, a shaft, a plunger carrying a cutting-die, levers forming a toggle connected to the plunger, a cam fixed to the shaft, a bar connected to the toggle having an elongated slot through which the shaft passes, a projection on the bar engaging the cam whereby said bar is caused to operate the toggle and reciprocate the plunger, with means for feeding a strip of material to the plunger, substantially as described.

4. In a label-making machine, the combination of means for feeding a strip of material, a frame carrying a reciprocating plunger having on it a die constructed to partially cut out a label from said strip, a knife carried by the frame adjacent to the plunger but independent thereof and normally maintained in a raised position, with a device carried by the plunger for depressing said knife after the operation of the feeding mechanism, substantially as described.

5. In a label-making machine, the combination of a frame carrying a plunger constructed to partially cut out a label, means for feeding a strip of material thereto, a pivoted knife also carried by the frame adjacent to the plunger, a spring acting on the knife to normally maintain it in an elevated position and an arm on the plunger projecting over the knife whereby individual labels are completely cut from the strip after the same has been fed past the cutting-plunger, with means for operating the plunger, substantially as described.

6. In a label-making machine, the combination of a frame, a plunger for partially cutting out labels, means for operating the same, means for feeding a strip of material to said plunger, a knife for cutting off finished labels from the strip, a reciprocating standard having on it a friction-roller, a plate on which said roller moves with its standard, and vertically-moving jaws on the standard having mechanism through which they are operated by motion of said plate for grasping a label and means for moving the standard whereby the label is carried away from the cutting-off knife, substantially as described.

In testimony whereof we have signed our names to this specification in the presence of two subscribing witnesses.

STEPHEN B. TILY.
JOHN G. REHFUSS.
MARTIN O. REHFUSS.

Witnesses:
WILLIAM E. BRADLEY,
JOS. H. KLEIN.